US011326030B2

(12) United States Patent
Lee et al.

(10) Patent No.: US 11,326,030 B2
(45) Date of Patent: May 10, 2022

(54) COLORLESS AND TRANSPARENT POLYAMIDE-IMIDE FILM, AND MANUFACTURING METHOD THEREFOR

(71) Applicant: SKC CO., LTD., Gyeonggi-do (KR)

(72) Inventors: Jin Woo Lee, Gyeonggi-do (KR); Dong Jin Lim, Gyeonggi-do (KR); Jae In Ahn, Gyeonggi-do (KR); Jong Ho Lee, Gyeonggi-do (KR); Sang Il Kim, Gyeonggi-do (KR); Sun Hwan Kim, Incheon (KR); Dae Sung Oh, Seoul (KR); Dawoo Jeong, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 320 days.

(21) Appl. No.: 16/088,390

(22) PCT Filed: Apr. 11, 2017

(86) PCT No.: PCT/KR2017/003889
§ 371 (c)(1),
(2) Date: Sep. 25, 2018

(87) PCT Pub. No.: WO2017/179877
PCT Pub. Date: Oct. 19, 2017

(65) Prior Publication Data
US 2020/0339769 A1     Oct. 29, 2020

(30) Foreign Application Priority Data

Apr. 11, 2016 (KR) .................. 10-2016-0044370
Apr. 4, 2017 (KR) .................. 10-2017-0043801

(51) Int. Cl.
*C08G 73/14* (2006.01)
*C08J 5/18* (2006.01)
*C08G 73/10* (2006.01)
*C08L 79/08* (2006.01)

(52) U.S. Cl.
CPC ............ *C08J 5/18* (2013.01); *C08G 73/1039* (2013.01); *C08L 79/08* (2013.01); *C08L 2201/10* (2013.01); *C08L 2203/16* (2013.01); *C08L 2203/20* (2013.01)

(58) Field of Classification Search
CPC ......... C08L 79/08; C08G 73/14; C09J 179/08
See application file for complete search history.

(56) References Cited

U.S. PATENT DOCUMENTS

| 2010/0018756 A1* | 1/2010 | Shimeno | ................ B32B 27/18 |
| | | | 174/254 |
| 2012/0296050 A1* | 11/2012 | Cho | ........................ C08L 79/08 |
| | | | 525/436 |

FOREIGN PATENT DOCUMENTS

| JP | 9-118748 | 5/1997 |
| JP | 9-176306 | 7/1997 |
| JP | 2016125063 | 7/2016 |
| KR | 1020030009437 | 1/2003 |
| KR | 1020050113384 | 12/2005 |
| KR | 1020130029129 | 3/2013 |
| KR | 1020130071650 | 7/2013 |
| KR | 1020130091217 | 8/2013 |
| KR | 1020150077177 | 7/2015 |
| KR | 1020160003606 | 1/2016 |

OTHER PUBLICATIONS

Office Action issued by the Japanese Patent Office dated Nov. 12, 2019.
Office Action issued by the Korean Intellectual Property Office dated Jun. 8, 2017.
Office Action issued by the Korean Intellectual Property Office dated Jul. 24, 2017.
Office Action issued by the Korean Intellectual Property Office dated Nov. 28, 2017.

\* cited by examiner

*Primary Examiner* — Gregory Listvoyb
(74) *Attorney, Agent, or Firm* — IP & T Group LLP

(57) ABSTRACT

Disclosed herein are a polyamide-imide film which is transparent and exhibits superior mechanical properties such as surface hardness, etc. and a method of preparing the same. The polyamide-imide film a copolymer of an aromatic diamine, an aromatic dianhydride, and an aromatic dicarbonyl compound, wherein the aromatic diamine and the aromatic dianhydride forms an imide unit; the aromatic diamine and the aromatic dicarbonyl compound forms an amide unit; and the amide unit accounts for 50-70 mol % of 100 mol % of the units of the copolymer, thereby exhibiting transparency and superior mechanical properties including surface hardness.

5 Claims, 1 Drawing Sheet

[Fig. 1]
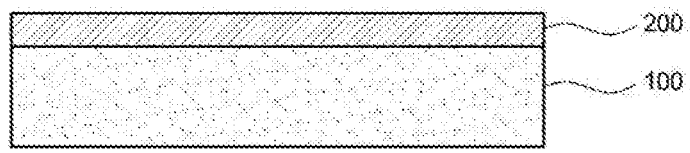
[Fig. 2]
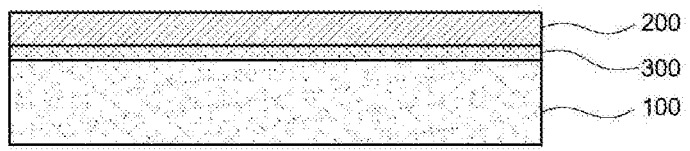
[Fig. 3]
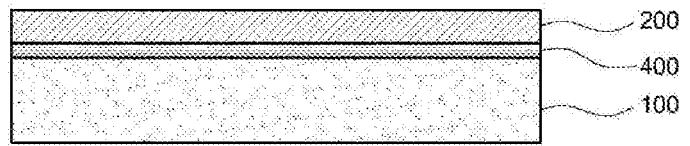
[Fig. 4]
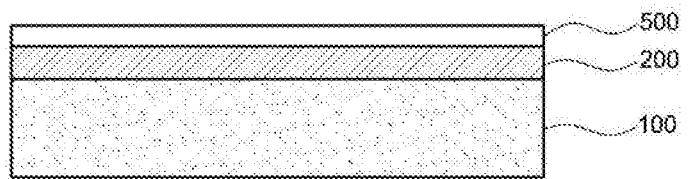

COLORLESS AND TRANSPARENT POLYAMIDE-IMIDE FILM, AND MANUFACTURING METHOD THEREFOR

CROSS-REFERENCE TO RELATED APPLICATIONS

This application is a national stage application of PCT/KR2017/003889 filed on Apr. 11, 2017 which claims priority of Korean patent application number 10-2016-0044370 and Korean patent application number 10-2017-0043801 filed on Apr. 11, 2016 and Apr. 4, 2017, respectively. The disclosure of each of the foregoing applications is incorporated herein by reference in its entirety.

TECHNICAL FIELD

The present invention relates to a polyamide-imide film which is colorless and transparent and exhibits superior mechanical properties including surface hardness, etc., and a method for preparing the same.

BACKGROUND ART

Polyimide resin is a highly heat-resistant resin obtained by ring-closure imidization of a polyamic acid derivative solution polymerized from an aromatic dianhydride and an aromatic diamine or an aromatic diisocyanate.

As the aromatic dianhydride, pyromellitic dianhydride (PMDA), biphenyltetracarboxylic dianhydride (BPDA), etc. may be used. And, as for the aromatic diamine, oxydianiline (ODA), p-phenylenediamine (p-PDA), m-phenylenediamine (m-PDA), methylenedianiline (MDA), bisaminophenylhexafluoroproane (HFDA), etc. may be used.

The polyimide resin is superior in thermal oxidation resistance, heat resistance, radiation resistance, low temperature properties, chemical resistance, etc. Therefore, the polyimide resin is commonly used as heat-resistant high-tech materials for automobiles, airplanes, spaceships, etc., or as electronic materials such as insulating coatings, insulating films, semiconductors, electrode protective films for TFT-LCD, etc.

However, the polyimide resin tends to turn brown or yellow due to the high density of aromatic rings. Therefore, the polyimide resin cannot be used for the products requiring transparency such as films.

For this reason, there have been many attempts to improve the transparency of polyimide film. In this aspect, Korean Patent Publication No. 10-2003-0009437 solved the transmittance and transparency problems without significantly decreasing thermal properties by using a monomer having a bent structure whose m-position, rather than its p-position, is connected with a functional group such as —O—, —SO2-, CH2-, etc. and an aromatic dianhydride having a substituent such as —CF3, etc. or an aromatic diamine monomer. However, the film is still inappropriate for a display by exhibiting unsatisfactory birefringence properties or mechanical properties including surface hardness, elastic modulus, etc.

Accordingly, development of a polyimide film with superior optical properties such as transparency and mechanical properties including surface hardness are still required.

REFERENCES OF THE RELATED ART

Patent Document

Korean Patent Publication No. 10-2003-0009437.

DISCLOSURE OF THE INVENTION

Technical Problem

The present invention has been made to solve the above-mentioned problems and limitations, and has the following purpose.

The present invention is directed to providing a polyamide-imide film with superior mechanical and optical properties even without introduction of inorganic particles by adequately mixing polyimide and polyamide.

The present invention is not limited to that mentioned above. The present invention will be more apparent by the following description and will be embodied by the means described in the appended claims and their combinations.

Solution to the Problem

In order to achieve the above purpose, the present invention can include the following:

The present invention provides a polyamide-imide film which is a copolymer of an aromatic diamine, an aromatic dianhydride, a first aromatic dicarbonyl compound and a second aromatic dicarbonyl compound, wherein the first aromatic dicarbonyl compound is represented by Formula 3, the second aromatic dicarbonyl compound is represented by Formula 4, and the second aromatic dicarbonyl compound contains more aromatic rings than the first aromatic dicarbonyl compound:

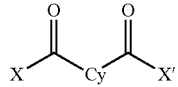

[Formula 3]

wherein X and X' are the same or different halogen ions and Cy is a substituted or unsubstituted monocyclic to tetracyclic aromatic ring; and

[Formula 4]

wherein X and X' are the same or different halogen ions, each of Cy1 and Cy2, which are the same or different, is a substituted or unsubstituted monocyclic to tetracyclic aromatic ring, m is an integer from 0 to 5, n is an integer from 0 to 5 and m+n is 1 or greater.

In a specific exemplary embodiment of the present invention, in Formula 3, the Cy may be a substituted or unsubstituted monocyclic aromatic ring.

In a specific exemplary embodiment of the present invention, in Formula 4, the Cy1 and the Cy2 may be substituted or unsubstituted monocyclic aromatic rings and the m+n may be 2 or greater.

In a specific exemplary embodiment of the present invention, in Formula 4, the Cy1 or the Cy2 may be a bicyclic aromatic ring.

In a specific exemplary embodiment of the present invention, the copolymer may contain an imide unit derived from the aromatic diamine and the aromatic dianhydride; and an amide unit derived from the aromatic diamine and the first aromatic dicarbonyl compound or derived from the aromatic diamine and the second aromatic dicarbonyl compound, wherein the amide unit accounts for 50-80 mol % of 100 mol % of the units of the copolymer.

In a specific exemplary embodiment of the present invention, the amide unit may accounts for 60-70 mol % of 100 mol % of the units of the copolymer.

In a specific exemplary embodiment of the present invention, the aromatic diamine may be 2,2'-bis(trifluoromethyl)-4,4'-diaminodiphenyl (TFDB) and the aromatic dianhydride may be 2,2-bis(3,4-dicarboxyphenyl)hexafluoropropane dianhydride (6-FDA).

In a specific exemplary embodiment of the present invention, the first aromatic dicarbonyl compound may be terephthaloyl chloride (TPC) and the second aromatic dicarbonyl compound may be selected from a group consisting of 1,1-biphenyl-4,4-dicarbonyl dichloride (BPDC), 2,6-naphthalene dicarbonyl dichloride (NADOC) and a mixture thereof.

In a specific exemplary embodiment of the present invention, the unit derived from 1,1-biphenyl-4,4-dicarbonyl dichloride (BPDC) may accounts for 50-70 mol % of 100 mol % of the amide unit.

In a specific exemplary embodiment of the present invention, the unit derived from 2,6-naphthalene dicarbonyl dichloride (NADOC) may accounts for 50-70 mol % of 100 mol % of the amide unit.

In a specific exemplary embodiment of the present invention, the polyamide-imide film may have a surface hardness of H to 4H based on a thickness of 20-100 μm.

In a specific exemplary embodiment of the present invention, the polyamide-imide film may have a transmittance of 89% or higher measured at 550 nm and a haze of lower than 1% based on a thickness of 20-100 μm.

In a specific exemplary embodiment of the present invention, the polyamide-imide film may have a yellowness index (YI) of 3 or lower based on a thickness of 20-100 μm.

In a specific exemplary embodiment of the present invention, the polyamide-imide film may have a tensile strength of 5.0 GPa or greater based on a thickness of 20-100 μm.

In another aspect, the present invention provides a cover window containing a polyamide-imide film which is a copolymer of an aromatic diamine, an aromatic dianhydride, a first aromatic dicarbonyl compound and a second aromatic dicarbonyl compound, wherein the first aromatic dicarbonyl compound is represented by Formula 3, the second aromatic dicarbonyl compound is represented by Formula 4, the second aromatic dicarbonyl compound contains more aromatic rings than the first aromatic dicarbonyl compound, and the polyamide-imide film has a transmittance of 89% or higher measured at 550 nm; a haze of lower than 1%; a yellowness index (YI) of 3 or lower; and a tensile strength of 5.0 GPa or greater, based on a thickness of 20-100 μm:

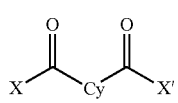

[Formula 3]

wherein X and X' are the same as each other or different halogen ions and Cy is a substituted or unsubstituted monocyclic to tetracyclic aromatic ring; and

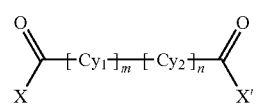

[Formula 4]

wherein X and X' are the same as each other or different halogen ions; Cy1 and Cy2 are the same as or different from each other and each is a substituted or unsubstituted monocyclic to tetracyclic aromatic ring; m is an integer from 0 to 5; n is an integer from 0 to 5; and m+n is 1 or greater.

In a specific exemplary embodiment of the present invention, the polyamide-imide film may have a tensile strength of 6 GPa or greater based on a thickness of 20-100 μm.

In a specific exemplary embodiment of the present invention, the polyamide-imide film may have a surface hardness of H to 4H based on a thickness of 20-100 μm.

In another aspect, the present invention provides a display device including: a display panel; and a cover window disposed on the display panel, wherein the cover window contains a polyamide-imide film, the polyamide-imide film being a copolymer of an aromatic diamine, an aromatic dianhydride, a first aromatic dicarbonyl compound and a second aromatic dicarbonyl compound, wherein the first aromatic dicarbonyl compound is represented by Formula 3, the second aromatic dicarbonyl compound is represented by Formula 4, the second aromatic dicarbonyl compound contains more aromatic rings than the first aromatic dicarbonyl compound, and the polyamide-imide film has a transmittance 89% or higher measured at 550 nm; a haze of lower than 1%; a yellowness index (YI) of 3 or lower; and a tensile strength of 5.0 GPa or greater. based on a thickness of 20-100 μm:

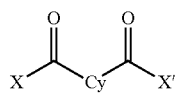

[Formula 3]

wherein X and X' are the same as each other or different halogen ions and Cy is a substituted or unsubstituted monocyclic to tetracyclic aromatic ring; and

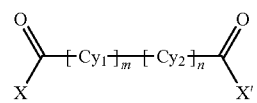

[Formula 4]

wherein X and X' are the same as each other or different halogen ions; Cy1 and Cy2 are the same as or different from each other and each is a substituted or unsubstituted monocyclic to tetracyclic aromatic ring; m is an integer from 0 to 5; n is an integer from 0 to 5; and m+n is 1 or greater.

Advantageous Effects of the Invention

Since the present invention includes the above-described configuration, the present invention provides the following advantageous effects.

The polyamide-imide film according to the present invention exhibits excellent mechanical properties including surface hardness, elastic modulus, etc. while being colorless and transparent.

Accordingly, the polyamide-imide film according to the present invention is suitable to be used for an optical film, a cover window, etc. for a flexible display.

BRIEF DESCRIPTION OF THE DRAWINGS

FIG. 1 shows a first exemplary embodiment of a display device including a polyamide-imide film according to the present invention.

FIG. 2 shows a second exemplary embodiment of a display device including a polyamide-imide film according to the present invention.

FIG. 3 shows a third exemplary embodiment of a display device including a polyamide-imide film according to the present invention.

FIG. 4 shows a fourth exemplary embodiment of a display device including a polyamide-imide film according to the present invention.

BEST EMBODIMENT FOR CARRYING OUT THE INVENTION

Hereinafter, the present invention is described in detail through exemplary embodiments. The exemplary embodiments of the present invention can be modified variously within the scope of the present invention. However, the scope of the present invention is not limited to those exemplary embodiments.

In the description, details of well-known features and techniques may be omitted to avoid obscuring the present invention. In the description, "include" or "contain" means that there may be additional constituent elements unless specified otherwise.

A colorless and transparent polyamide-imide film of the present invention may be a copolymer of an aromatic diamine, an aromatic dianhydride, a first aromatic dicarbonyl compound, and a second aromatic dicarbonyl compound.

The copolymer may contain an imide unit derived from the aromatic diamine and the aromatic dianhydride; and an amide unit derived from either of the aromatic diamine and the first aromatic dicarbonyl compound, or the aromatic diamine and the second aromatic dicarbonyl compound.

The copolymer is formed as the aromatic diamine forms imide bonding with the aromatic dianhydride and amide bonding with the first aromatic dicarbonyl compound or the second aromatic dicarbonyl compound.

The aromatic diamine may be at least one selected from a group consisting of 2,2-bis[4-(4-aminophenoxy)-phenyl] propane (6HMDA), 2,2'-bis(trifluoromethyl)-4,4'-diaminobiphenyl (2,2'-TFDB), 3,3'-bis(trifluoromethyl)-4,4'-diaminobiphenyl (3,3'-TFDB), 4,4'-bis(3-aminophenoxy)diphenylsulfone (DBSDA), bis(3-aminophenyl)sulfone (3DDS), bis(4-aminophenyl)sulfone (4DDS), 1,3-bis(3-aminophenoxy)benzene (APB-133), 1,4-bis(4-aminophenoxy)benzene (APB-134), 2,2'-bis[3(3-aminophenoxy)phenyl]hexafluoropropane (3-BDAF), 2,2'-bis[4(4-aminophenoxy)phenyl]hexafluoropropane (4-BDAF) and oxydianiline (ODA). More specifically, the aromatic diamine may be 2,2'-bis(trifluoromethyl)-4,4'-diaminobiphenyl (TFDB) represented by Formula 1.

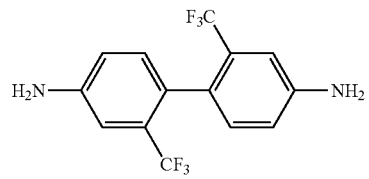

[Formula 1]

The aromatic dianhydride has a low birefringence value and thus can contribute to the improvement of optical properties of the polyamide-imide film such as transmittance, etc.

The aromatic dianhydride may be one or more selected from a group consisting of 2,2-bis(3,4-dicarboxyphenyl) hexafluoropropane dianhydride (6-FDA), 4-(2,5-dioxotetrahydrofuran-3-yl)-1,2,3,4-tetrahydronaphthalene-1,2-dicarboxylic anhydride (TDA), 4,4'-(4,4'-isopropylidenediphenoxy)bis(phthalic anhydride) (HBDA), 3,3'-(4,4'-oxydiphthalic dianhydride) (ODPA) and 3,4,3',4'-biphenyltetracarboxylic dianhydride (BPDA). More specifically, the aromatic dianhydride may be 2,2-bis(3,4-dicarboxyphenyl)hexafluoropropane dianhydride (6-FDA) represented by Formula 2.

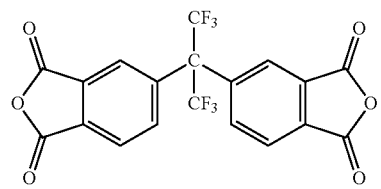

[Formula 2]

The first aromatic dicarbonyl compound and the second aromatic dicarbonyl compound may contribute to the improvement of mechanical properties of the polyamide-imide film including surface hardness, tensile strength, etc.

The first aromatic dicarbonyl compound may be represented by Formula 3:

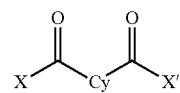

[Formula 3]

wherein X and X' are the same as each other or different halogen ions and Cy is a substituted or unsubstituted monocyclic to tetracyclic aromatic ring.

In Formula 3, the Cy may be a substituted or unsubstituted monocyclic aromatic ring.

The second aromatic dicarbonyl compound may be represented by Formula 4:

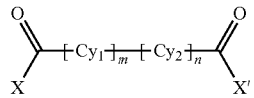

[Formula 4]

wherein X and X' are the same as each other or different halogen ions; Cy1 and Cy2 are the same as or different from each other and each is a substituted or unsubstituted monocyclic to tetracyclic aromatic ring; m is an integer from 0 to 5; n is an integer from 0 to 5; and m+n is 1 or greater.

In Formula 4, the Cy1 and the Cy2 may be substituted or unsubstituted monocyclic aromatic rings and the m+n may be 2 or greater.

Also, in Formula 4, the Cy1 or the Cy2 may be a bicyclic aromatic ring.

The second aromatic dicarbonyl compound may contain more aromatic rings than the first aromatic dicarbonyl compound.

Specifically, the first aromatic dicarbonyl compound may be terephthaloyl chloride (TPC) represented by Formula 5 and the second aromatic dicarbonyl compound may be selected from a group consisting of 1,1-biphenyl-4,4-dicarbonyl dichloride (BPDC) represented by Formula 6, 2,6-naphthalene dicarbonyl dichloride (NADOC) represented by 1 Formula 7 and a mixture thereof:

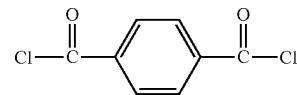

[Formula 5]

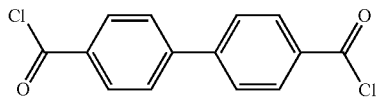

[Formula 6]

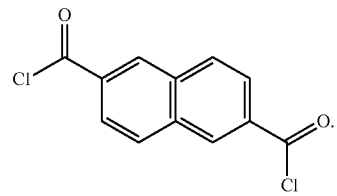

[Formula 7]

More specifically, the polyamide-imide film may contain terephthaloyl chloride (TPC) as the first aromatic dicarbonyl compound and 1,1-biphenyl-4,4-dicarbonyl dichloride (BPDC) as the second aromatic dicarbonyl compound; or may contain terephthaloyl chloride (TPC) as the first aromatic dicarbonyl compound and 2,6-naphthalene dicarbonyl dichloride (NADOC) as the second aromatic dicarbonyl compound.

The imide unit derived from the aromatic diamine and the aromatic dianhydride contains the aromatic dianhydride and thus contributes to the improvement of optical properties including transmittance, haze, etc. Also, the amide unit derived from the aromatic diamine and either of the first aromatic dicarbonyl compound or the second aromatic dicarbonyl compound contains the aromatic dicarbonyl compound, and thus contributes to the improvement of mechanical properties including surface hardness, etc.

Accordingly, by means of polymerization the contents of the imide unit and the amide unit are within a predetermined range, and a polyamide-imide film with balanced and improved optical properties; mechanical properties; and flexibility can be obtained.

Specifically, the amide unit may account for 50-80 mol %, more preferably 60-70 mol %, of 100 mol % of the units of the copolymer.

When the content of the amide unit is less than 50 mol %, surface may be defected by unsatisfactory surface hardness and be damaged by friction, etc. Also, the elastic modulus of the film may be unsatisfactory. For these reasons, the film may not be appropriated for a flexible display, a cover window, etc.

When the content of the amide unit exceeds 80 mol %, transparency may be unsatisfactory due to lack of the imide unit. In this case, it may be difficult to use the film as a film for a display.

And, when the first aromatic dicarbonyl compound is terephthaloyl chloride (TPC) and the second aromatic dicarbonyl compound is 1,1-biphenyl-4,4-dicarbonyl dichloride (BPDC), the unit derived from 1,1-biphenyl-4,4-dicarbonyl dichloride (BPDC) may account for specifically 50-70 mol % of 100 mol % of the amide unit. When the content of the unit derived from 1,1-biphenyl-4,4-dicarbonyl dichloride (BPDC) is less than 50 mol %, the film may not be appropriated for a flexible display, a cover window, etc. because it is easily deformed by external force due to unsatisfactory elastic modulus. On the other hand, when it exceeds 70 mol %, haze may be severe and yellowing may occur due to increased yellowness index. In this case, it may be difficult to use the film as a film for a display because transmittance is unsatisfactory.

And, when the first aromatic dicarbonyl compound is terephthaloyl chloride (TPC)) and the second aromatic dicarbonyl compound is 2,6-naphthalene dicarbonyl dichloride (NADOC), the unit derived from 2,6-naphthalene dicarbonyl dichloride (NADOC) may account for specifically 50-70 mol % of 100 mol % of the amide unit. When the content of the unit derived from 2,6-naphthalene dicarbonyl dichloride (NADOC) is less than 50 mol %, it may be difficult to use the film as an optical film for a flexible display, a film for a cover window, etc. because it is easily deformed by external force due to unsatisfactory elastic modulus. On the other hand, when it exceeds 70 mol %, haze may be severe and yellowing may occur due to increased yellowness index. In this case, it may be difficult to use the film as a film for a display because transmittance becomes unsatisfactory.

The colorless and transparent polyamide-imide film of the present invention may be prepared by a process including a step of conducting reaction by adding an aromatic dianhydride to a solution of an aromatic diamine, a step of preparing a polyamic acid solution by adding a first aromatic dicarbonyl compound and a second aromatic dicarbonyl compound to the reaction product and a step of preparing a polyamide-imide film by coating and drying the polyamic acid solution.

Descriptions about the aromatic diamine, the aromatic dianhydride, the first aromatic dicarbonyl compound and the second aromatic dicarbonyl compound will be omitted because they are given above.

A solvent for the polymerization reaction is not particularly limited as long as it can dissolve the monomers. As known reaction solvents, one or more polar solvent selected from a group consisting of m-cresol, N-methyl-2-pyrrolidone (NMP), dimethylformamide (DMF), dimethylacetamide (DMAc), dimethyl sulfoxide (DMSO), acetone, diethyl acetate, etc. may be used.

Although the content of the solvent is not particularly limited, it may be specifically 40-95 wt %, more specifically 50-90 wt %, of the total solution to achieve suitable molecular weight and viscosity of the solution.

Although the reaction condition is not particularly limited, reaction temperature may be specifically −20 to 80° C. and reaction time may be specifically 30 minutes to 24 hours. More specifically, the reaction may be conducted under an inert atmosphere such as such as argon, nitrogen, etc.

Although the thickness of the obtained polyamide-imide film is not particularly limited, it may be specifically 10-250 μm, more specifically 20-100 μm.

The polyamide-imide film according to the present invention may have a surface hardness of H to 4H based on a thickness of 20-100 μm, more specifically 30-70 μm.

Also, it may have a transmittance measured at 550 nm of 89% or higher, a haze of lower than 1% and a yellowness index (YI) of 3 or lower based on a thickness of 20-100 μM.

Also, it may have a tensile strength of 5.0 GPa or greater based on a thickness of 20-100 μm.

Because the polyamide-imide film according to the present invention is superior in both optical properties including transmittance, haze, yellowness index, etc. and mechanical properties including surface hardness, tensile strength, etc. it is suitable to be used for a cover window of a display device such as a liquid crystal display (LCD), an organic light-emitting display (OLED), etc.

A display device including the polyamide-imide film according to the present invention is configured as follows.

As shown in FIG. 1, the display device may include a display panel 100 and a cover window 200 disposed on the display panel 100.

The display panel 100 may be a liquid crystal display panel or an organic light-emitting display panel.

The cover window 200 is provided to protect the display panel and may contain the polyamide-imide film. A detailed description about the polyamide-imide film will be omitted because it is given above.

The display device may further include a polarizing plate 300 interposed between the display panel 100 and the cover window 200 as shown in FIG. 2 or may further include a touch panel 400 interposed between the display panel 100 and the cover window 200 as shown in FIG. 3.

The polarizing plate 300 is provided to block transmission of light along a specific direction and a polarizing plate of any material and structure may be used if it can perform this function.

The touch panel 400 is not particularly limited in constitution or structure and any one may be used if it can perform its function.

The display device may further include a cover window 200 and a hard coating layer 500 disposed on at least one side of the cover window 200 as shown in FIG. 4. In FIG. 2, the hard coating layer 500 is shown to be disposed on the upper side of the cover window 200. However, without being limited thereto, the hard coating layer 500 may be disposed on the lower side or on both sides of the cover window 200.

The material of the hard coating layer 500 is not particularly limited. Various materials may be used without limitation if the surface hardness, etc. of the cover window can be improved.

The cover window 200 may be attached to the display panel 100 by an adhesion member (not shown). However, without being limited thereto, the cover window 200 may be disposed on the display panel 100 using, for example, a case of the display panel 100.

Embodiments for Carrying Out the Invention

The present invention will be described in more detail through examples. The following examples are for illustrative purposes only and it will be apparent to those skilled in the art that the scope of this invention is not limited by the examples.

Example 1

After filling 710.8 g of dimethylacetamide (DMAc) in a temperature-controllable 1-L dual jacket glass reactor at 20° C. under a nitrogen atmosphere, 64 g (0.2 mol) of 2,2'-bis (trifluoromethyl)-4,4'-diaminodiphenyl (2,2'-TFDB) as an aromatic diamine was dissolved therein by adding slowly. Then, the mixture was stirred for 1 hour with 26.6 g (0.06 mol) of 2,2-bis(3,4-dicarboxyphenyl) hexafluoropropane dianhydride (6-FDA) as an aromatic dianhydride slowly added Then, after adding 23.4 g (0.084 mol) of 1,1-biphenyl-4,4-dicarbonyl dichloride (BPDC) as a first aromatic dicarbonyl compound and stirring for 1 hour, a polymer solution was prepared by adding 11.4 g (0.056 mol) of terephthaloyl chloride (TPC) as a second aromatic dicarbonyl compound and stirring for 1 hour.

The polymer solution was coated on a glass plate and dried with hot air of 80° C. for 30 minutes. The dried polyamide-imide copolymer was removed from the glass plate and then fixed to a pin frame. Then, a polyamide-imide film with a thickness of 30 μm was obtained by heating from 80 to 300° C. at a rate of 2° C./min.

Example 2

A film was prepared in the same manner as in Example 1, except that 26.6 g (0.06 mol) of 6-FDA, 27.3 g (0.098 mol) of BPDC and 8.5 g (0.042 mol) of TPC were added.

Example 3

A film was prepared in the same manner as in Example 1, except that 35.5 g (0.08 mol) of 6-FDA, 20 g (0.072 mol) of BPDC and 9.8 g (0.048 mol) of TPC were added.

Example 4

A film was prepared in the same manner as in Example 1, except that 44.3 g (0.1 mol) of 6-FDA, 16.7 g (0.06 mol) of BPDC and 8.1 g (0.04 mol) of TPC were added.

Comparative Example 1

A film was prepared in the same manner as in Example 1, except that BPDC was not added and 26.6 g (0.06 mol) of 6-FDA and 28.5 g (0.14 mol) of TPC were added.

Comparative Example 2

A film was prepared in the same manner as in Example 1, except that TPC was not added and 26.6 g (0.06 mol) of 6-FDA and 39 g (0.14 mol) of BPDC were added.

Comparative Example 3

A film was prepared in the same manner as in Example 1, except that BPDC was not added and 17.7 g (0.04 mol) of 6-FDA and 32.6 g (0.16 mol) of TPC were added.

Comparative Example 4

A film was prepared in the same manner as in Example 1, except that 26.6 g (0.06 mol) of 6-FDA, 31.2 g (0.112 mol) of BPDC and 5.7 g (0.028 mol) of TPC were added.

Comparative Example 5

A film was prepared in the same manner as in Example 1, except that BPDC was not added and 44.3 g (0.1 mol) of 6-FDA and 20.3 g (0.1 mol) of TPC were added.

Comparative Example 6

A film was prepared in the same manner as in Example 1, except that 62.1 g (0.14 mol) of 6-FDA, 10 g (0.036 mol) of BPDC and 4.9 g (0.024 mol) of TPC were added.

Comparative Example 7

A film was prepared in the same manner as in Example 1, except that 8.9 g (0.02 mol) of 6-FDA, 30 g (0.108 mol) of BPDC and 14.6 g (0.072 mol) of TPC were added.

The components added in the examples and the comparative examples are summarized as in Table 1.

TABLE 1

| | 6-FDA [mol] | TPC [mol] | BPDC [mol] | TFMB [mol] |
|---|---|---|---|---|
| Example 1 | 0.06 | 0.056 | 0.084 | 0.2 |
| Example 2 | 0.06 | 0.042 | 0.098 | 0.2 |
| Example 3 | 0.08 | 0.048 | 0.072 | 0.2 |
| Example 4 | 0.1 | 0.040 | 0.06 | 0.2 |
| Comparative Example 1 | 0.06 | 0.14 | 0 | 0.2 |
| Comparative Example 2 | 0.06 | 0 | 0.14 | 0.2 |
| Comparative Example 3 | 0.04 | 0.16 | 0 | 0.2 |
| Comparative Example 4 | 0.06 | 0.028 | 0.112 | 0.2 |
| Comparative Example 5 | 0.1 | 0.1 | 0 | 0.2 |
| Comparative Example 6 | 0.14 | 0.024 | 0.036 | 0.2 |
| Comparative Example 7 | 0.02 | 0.072 | 0.108 | 0.2 |

In the polyamide-imide films prepared from the compositions shown in Table 1, the mol % of an amide unit of 100 mol % of the units of the copolymer (i) and the mol % of a unit derived from 1,1-biphenyl-4,4-dicarbonyl dichloride (BPDC) of 100 mol % of the amide unit (ii) are shown in Table 2.

TABLE 2

| | Amide unit [mol %] | BPDC-derived unit [mol %] |
|---|---|---|
| Example 1 | 70 | 60 |
| Example 2 | 70 | 70 |
| Example 3 | 60 | 60 |
| Example 4 | 50 | 60 |
| Comparative Example 1 | 70 | 0 |
| Comparative Example 2 | 70 | 100 |
| Comparative Example 3 | 80 | 0 |
| Comparative Example 4 | 70 | 80 |
| Comparative Example 5 | 50 | 0 |
| Comparative Example 6 | 30 | 60 |
| Comparative Example 7 | 90 | 60 |

Test Example 1

The mechanical properties of the films of Examples 1-4 and Comparative Examples 1-7 were measured as described below. The result is given in Table 3.

1. Surface Hardness

Surface hardness was measured by a pencil hardness tester (CT-PC1, CoreTech, Korea). A pencil for hardness measurement was mounted at an angle of 45° and measurement was made at a pencil speed of 300 mm/min while applying a constant load (750 g). Mitsubishi pencils with hardness of H-9H, F, HB, B-6B, etc. were used.

2. Yellowness Index (YI)

Yellowness index (YI) was measured by a spectrophotometer (Hunter Associates Laboratory's UltraScan PRO).

3. Haze

Haze was measured by the NDH-5000W haze meter (Nippon Denshoku Industries).

4. Transmittance

Transmittance was measured at 380-780 nm by a UV spectrometer.

5. Modulus

Modulus was measured by the Instron's UTM (4206-001).

TABLE 3

| | Hardness | Transmittance [%] | Haze [%] | YI | Modulus [GPa] |
|---|---|---|---|---|---|
| Example 1 | H | 89.9 | 0.4 | 2.1 | 5.5 |
| Example 2 | 2H | 89.7 | 0.6 | 2.3 | 6.0 |
| Example 3 | H | 90.1 | 0.3 | 1.9 | 5.3 |
| Example 4 | HB | 90.2 | 0.3 | 1.8 | 5.2 |
| Comparative Example 1 | HB | 89.9 | 0.4 | 2.1 | 3.9 |
| Comparative Example 2 | H | 88.8 | 5.6 | 3.7 | 5.7 |
| Comparative Example 3 | H | 89.8 | 0.6 | 2.3 | 4.0 |
| Comparative Example 4 | H | 88.0 | 3.9 | 2.7 | 6.0 |
| Comparative Example 5 | HB | 89.5 | 0.4 | 1.9 | 3.8 |
| Comparative Example 6 | 6B | 90.8 | 0.2 | 1.3 | 3.7 |
| Comparative Example 7 | H | 87.7 | 15.2 | 4.6 | 6.5 |

From Table 3, it can be seen that the films of Comparative Example 1, Comparative Example 3 and Comparative Example 5 which do not contain the unit derived from 1,1-biphenyl-4,4-dicarbonyl dichloride (BPDC) have very low elastic modulus than those of Examples 1-4.

The films of Comparative Example 2 and Comparative Example 4 which contain the unit derived from 1,1-biphenyl-4,4-dicarbonyl dichloride (BPDC) in an amount exceeding 70 mol % showed high YI (yellowness index), haze and low transmittance.

The film of Comparative Example 6 which contains the amide unit in an amount less than 50 mol % showed very low surface hardness and the film of Comparative Example 7 which contains the amide unit in an amount exceeding 80 mol % showed unsatisfactory transparency (transmittance, haze and YI) due to lack of the imide unit.

In contrast, the polyamide-imide films of Examples 1-4 showed superior mechanical properties with a surface hardness of HB or higher and an elastic modulus of 5 GPa or greater. They also exhibited excellent optical properties with a transmittance of 89% or higher and a yellowness index (YI) of 3 or lower. Accordingly, it can be seen that the polyamide-imide film according to the present invention has excellent mechanical properties while being colorless and transparent.

Example 5

After filling 710.8 g of dimethylacetamide (DMAc) as an organic solvent in a temperature-controllable 1-L dual jacket glass reactor at 20° C. under a nitrogen atmosphere, 64 g (0.2 mol) of 2,2'-bis(trifluoromethyl)-4,4'-diaminodiphenyl (2,2'-TFDB) as an aromatic diamine was dissolved therein by adding slowly.

Then, the mixture was stirred for 1 hour while slowly adding 26.64 g (0.06 mol) of 2,2-bis(3,4-dicarboxyphenyl) hexafluoropropane dianhydride (6-FDA) as an aromatic dianhydride.

Then, after adding 21.26 g (0.084 mol) of 2,6-naphthalene dicarbonyl dichloride (NADOC) as a second aromatic dicarbonyl compound and stirring for 1 hour, a polymer solution was prepared by adding 9.74 g (0.048 mol) of terephthaloyl chloride (TPC) as a first aromatic dicarbonyl compound and stirring for 1 hour.

After adding 1 mL of a 10 wt % TPC solution (10 wt % TPC solution in DMAc) to the polymer solution, the mixture was stirred for 30 minutes. This process was repeated until the viscosity of the polymer solution reached 15 cps.

The polymer solution was coated on a glass plate and dried with hot air of 80° C. for 30 minutes. The dried polyamide-imide copolymer was removed from the glass plate and then fixed to a pin frame. Then, a polyamide-imide film with a thickness of 30 μm was obtained by heating from 80 to 300° C. at a rate of 2° C./min.

Example 6: Preparation of Polyamide-Imide Film Using Large-Scale Facility

After filling 355 kg of dimethylacetamide (DMAc) in a temperature-controllable dual jacket SUS polymerization reactor at 20° C. under a nitrogen atmosphere, 32 kg (100 mol) of 2,2'-bis(trifluoromethyl)-4,4'-diaminodiphenyl (TFDB) was dissolved therein by adding slowly. Then, the mixture was stirred for 1 hour with 13.3 kg (30 mol) of 2,2-bis(3,4-dicarboxyphenyl) hexafluoropropane dianhydride (6-FDA) slowly added.

Then, after adding 11.7 kg (42 mol) of 1,1-biphenyl-4,4-dicarbonyl dichloride (BPDC), the mixture was stirred for 1 hour. Then, a polymer solution was prepared by adding 5.7 kg (28 mol) of terephthaloyl chloride (TPC) and stirring for 1 hour.

The polymer solution was transferred to a die using a pump, coated onto a belt and then dried with hot air of 80-120° C. The line speed was about 1 m/min and the total belt length was about 10 m. The dried polyamide-imide copolymer was removed from the belt and then fixed to a pin frame. A polyamide-imide film with a thickness of 30 μm could be wound with a length of 300 m or longer by treating at 80-300° C. with the same line speed.

Test Example 2

The mechanical properties of the films of Examples 5 and 6 were measured in the same manner as in Test Example 1. The result is given in Table 4.

TABLE 4

| | Hardness | Transmittance [%] | Haze [%] | YI | Modulus [GPa] |
|---|---|---|---|---|---|
| Example 5 | H | 89.9 | 0.3 | 2.1 | 5.9 |
| Example 6 | H | 89.2 | 0.23 | 1.9 | 5.9 |

From Table 4, it can be seen that polyamide-imide films having mechanical properties comparable to those of the films of Examples 1-4 could be prepared when terephthaloyl chloride (TPC) was used as the first aromatic dicarbonyl compound and 2,6-naphthalene dicarbonyl dichloride (NADOC) was used as the second aromatic dicarbonyl compound.

Also, it can be seen from Table 4 that a polyamide-imide film with satisfactory mechanical properties can be prepared even in large scale.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

DETAILED DESCRIPTION OF MAIN ELEMENTS

100: display panel
200: cover window
300: polarizing plate
400: touch panel
500: hard coating layer

The invention claimed is:

1. A polyamide-imide film which is a copolymer of an aromatic diamine, an aromatic dianhydride, a first aromatic dicarbonyl compound, and a second aromatic dicarbonyl compound,
   wherein the aromatic diamine is 2,2'-bis(trifluoromethyl)-4,4'-diaminodiphenyl (TFDB),
   wherein the aromatic dianhydride is 2,2-bis(3,4-dicarboxyphenyl)hexafluoropropane dianhydride (6-FDA),
   wherein the first aromatic dicarbonyl compound is terephthaloyl chloride (TPC), and
   wherein the second aromatic dicarbonyl compound is selected from a group consisting of 1,1-biphenyl-4,4-dicarbonyl dichloride (BPDC), 2,6-naphthalene dicarbonyl dichloride (NADOC), and a mixture thereof, and
   wherein the copolymer comprises:
   an imide unit derived from the aromatic diamine and the aromatic dianhydride; and
   an amide unit derived from the aromatic diamine and the first aromatic dicarbonyl compound or derived from the aromatic diamine and the second aromatic dicarbonyl compound,
   wherein the amide unit accounts for 50 to 80 mol % of total 100 mol % of the units of the copolymer, and wherein the amide unit of 100 mol % comprises 50 to 70 mol % of a unit derived from the second aromatic dicarbonyl compound.

2. The polyamide-imide film according to claim 1, wherein the amide unit accounts for 60-70 mol % of 100 mol % of the units of the copolymer.

3. The polyamide-imide film according to claim 1, wherein a surface hardness ranges from H to 4H based on a thickness of 20-100 μm.

4. The polyamide-imide film according to claim 3, wherein a transmittance measured at 550 nm is 89% or higher and a haze is lower than 1% based on a thickness of 20-100 μm.

5. The polyamide-imide film according to claim 4, wherein a yellowness index (YI) is 3 or lower based on a thickness of 20-100 μm.

\* \* \* \* \*